Patented Aug. 18, 1936

2,051,470

UNITED STATES PATENT OFFICE 2,051,470

PRODUCTION OF SUBSTITUTED ACIDS FROM HALOGENATED KETONES

Martin de Simó and Clyve C. Allen, Berkeley, Calif., assignors to Shell Development Company, San Francisco, Calif., a corporation of Delaware No Drawing. Application November 19, 1934, Serial No. 753,647

23 Claims. (Cl. 260—113)

This invention relates to the preparation of substituted acids by the oxidation of halogenated ketones and is particularly concerned with the production of hydroxy and/or halogenated acids through oxidation of halogenated ketones while substantially avoiding side reactions.

We have discovered that by proper control of the conditions of oxidation of halogenated ketones, more particularly by suitably dissipating the thermal energy created as promptly as possible and/or carrying the reaction out in the presence of water and/or suitable third agents undesirable side reactions may be reduced to a practical minimum and economic yields of substituted acids obtained without excessive consumption of oxidizing agent.

For the purpose of making our invention more clear it will be described with more particular reference to the oxidation of alpha-chlor-ethyl-methyl ketone

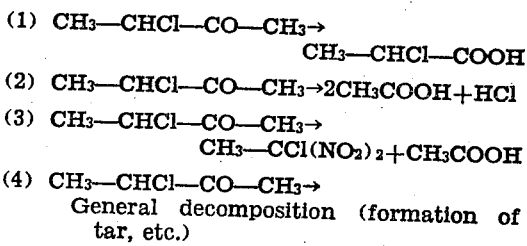

with nitric acid. But it will be understood that the principles involved are applicable to a wide variety of other halogenated ketones and/or other oxidizing agents.

When $\alpha$-chlor-ethyl-methyl ketone is treated with nitric acid the following changes may take place:

(1) $CH_3—CHCl—CO—CH_3 \rightarrow$
$CH_3—CHCl—COOH$ (2) $CH_3—CHCl—CO—CH_3 \rightarrow 2CH_3COOH + HCl$ (3) $CH_3—CHCl—CO—CH_3 \rightarrow$
$CH_3—CCl(NO_2)_2 + CH_3COOH$ (4) $CH_3—CHCl—CO—CH_3 \rightarrow$
General decomposition (formation of tar, etc.)

We have found that by adding one of the reactants, in this case preferably the nitric acid, in a highly disseminated form to the well stirred halogenated ketone, general decomposition (Equation 4) may be avoided. By diluting the reactants sufficiently, as with water, nitration (Equation 3) may be very materially reduced. Diluted oxidizing agents may thus be advantageously employed. By having a suitable third agent present, preferably added at the start, undesirable hydrolysis of the substituted ketone to ketols which are oxidizable to unsubstituted acids, as represented by Equation 2, may be substantially eliminated.

Halogenated ketones which are suitable for the preparation of substituted acids by our invention include, for example, the mono and poly chloro, bromo and iodo substitution products of aliphatic ketones such as acetone, methyl ethyl ketone, diethyl ketone, methyl propyl ketone, methyl isopropyl ketone, methyl normal butyl ketone, methyl secondary butyl ketone, methyl tertiary butyl ketone, ethyl propyl ketone, and homologues and analogues thereof, and aromatic ketones such as aceto-phenone, benzyl-ethyl ketone and homologues and analogues thereof wherein the alkyl radical possesses at least one halogen atom.

As suitable oxidizing agents nitric acid, chromic acid, potassium permanganate, and the like may be used. In certain cases as when, for example, nitric acid is used to oxidize halogen substituted aromatic ketones, further substitution of the ketone may take place during the oxidation via nitration of the cyclic radical or radicals.

The conditions of operation are preferably adjusted to the nature of the ketone used, the substituent or substituents present therein, and the oxidizing agent chosen. In any case, however, doubling the amount of diluent present, above that required to keep reactions such as represented by Equation (3) at a minimum, is without effect upon the yield of substituted acid when the reaction is carried out in the presence of sufficient suitable third agent. Excess of third agent above that required to prevent hydrolysis reactions, such as Equation (2), is also usually without effect.

Our invention may be carried out in many different ways. The reaction may be carried out in either the liquid or vapor phase. Liquid phase operation is preferred, however, as increased surface contact of reagents is promoted thereby. Furthermore, measurement and control of the addition of the reactants is simplified when they are in liquid form and uniformity of mixing, which prevents undesirable localized reactions, is greatly facilitated. The method of contacting the reactants has a marked influence upon the yield of the desired substituted acid. Due to the strongly exothermic nature of the reaction, the thermal energy created by the attack of the oxidizing agent is preferably dissipated as promptly as possible in order to avoid undesired disruption of the ketone molecule.

For reasons of economy it is also preferable that oxidizing agents such as nitric acid and the like be added to the halogenated ketone rather than that the halogenated ketone be added to an excess of nitric acid. By the former procedure the nitric acid is reduced to nitrogen, while in the latter method of operation the chief reduction product is nitrogen trioxide ($N_2O_3$) and the consumption of oxidizing agent may be more than twice as great. The advantages of careful addition of small amounts of oxidation agents to an excess of halogenated ketone diluted with water, for example, are counteracted by hydrolysis and/or chain or periodic reactions resulting in by-products. For the suppression of these reactions the presence of a third agent is desirable. As suitable third agents which may be used for this purpose are: stable non-oxidizing acids, of which sulfuric, phosphoric, hydrochloric, acetic, propionic, isobutyric and higher carboxylic acids and their substitution products, are typical, and acid acting salts, such as salts of weak bases and strong acids, as cupric sulfate, ferric nitrate, etc., or acid salts such as sodium hydrogen sulfate, primary potassium orthophosphate, and the like. More preferably, however, the halogenated acid which is being produced is employed; the required amount being added to the diluted ketone at the start of the reaction. In this way the recovery of the reaction product is greatly simplified.

For the initiation of the reaction, the addition of non-oxidizing acid may be omitted and the desired acid product allowed to build up under less economical conditions until a sufficient concentration is attained to afford the desired protection from said reactions throughout the remainder of the process.

The process may be conducted as a batch, intermittent or continuous operation. In one method of continuous operation, for example, the reactants may be added simultaneously into a reaction vessel maintained at a suitable temperature and the reaction products withdrawn at an equal rate. Alternatively one or both of the reagents may be atomized by injection through capillary orifices, or diffusion through sintered glass plates, or in other well known ways. Resort may be had to the addition of the oxidant, for example, in the form of hot gas or vapor.

Advantage may be taken of the catalytic influence of certain metal ions, such as $Hg^{++}$, $Cu^{++}$, $Fe^{+++}$, and the like ions, which may be used to initiate or promote the reaction. These ions may be added in the form of any suitably soluble salt.

The substituted acid produced may be recovered from our reacted mixture by any suitable conventional method such as salting-out in the case of concentrated solutions, or portion by portion or continuous extraction, or distillation, and the like.

Where it is desired to produce hydroxy acids rather than halogenated acids from halogenated ketones, the product of the above described oxidation reaction may be treated with about the calculated stoichiometric requirement of NaOH or other suitable basic agent whereby the corresponding salt of the halogenated acid will be formed. On dilution and hydrolysis of the substantially neutral solution approximately quantitative yields of hydroxy acid are obtained.

The following example illustrates one specific embodiment of our invention as applied to the production of halogenated and hydroxy acids. But it will be understood that similar results, as well as other substituted organic acids may be produced by modified procedures without departing from the spirit of our invention.

100 grams of α chlor-ethyl methyl ketone were mixed with 40 grams of alpha chlor propionic acid and 60 grams of water. 175 grams of concentrated (70%) nitric acid were slowly blow with air into this mixture through a capillary tube while the mixture was kept thoroughly stirred and was maintained at a temperature of about 80° to 100° C., preferably at about 88° to 94° C. The mixture turned green but no colored vapors were evolved. The reaction was vigorous and uniform.

After completion of the reaction, the mixed products were heated in vacuo. The first few ccs. distilled consisted of an aqueous solution overlying an oil. By separating the oil, returning the aqueous portion and redistilling, the oil was completely separated. The yields of the various products obtained expressed as pounds per pound of α chlor-ethyl methyl ketone used were as follows:

|   | Pounds |
|---|---|
| α chlor propionic acid | 0.72 |
| Acetic acid | 0.16 |
| Nitro derivatives (probably 1,1,1 dinitro chlor ethane) | 0.08 |

The α chlor propionic acid purified by redistillation was then treated with the calculated stoichiometric amount of NaOH as a dilute solution in water. The sodium α chlor propionate so formed was then further diluted with water until a solution containing 200 grams of water per mol of the sodium salt was obtained.

This solution was then hydrolyzed in an autoclave for two hours at about 130° C. The hydrolyzed product was extracted with ether in a continuous extractor. After a few hours a 97.0% yield of lactic acid was obtained in the form of an 85% solution in water after evaporation of the ether.

By procedures analogous to that described above for the production of α chlor propionic acid, monochlor acetic acid may be prepared from monochlor acetone or in exceptionally good yield from α, β dichlor methyl ethyl ketone ($CH_2Cl$—CO—$CH_2$—$CH_2Cl$); α bromo isobutyric acid from α bromo isopropyl methyl ketone ($CH_3$—CO—$CBr(CH_3)_2$); and dichloracetic acid from α, α dichloracetone ($CH_3$—CO—$CHCl_2$). The corresponding hydroxy acids, namely glycollic and α hydroxy isobutyric acids, may be made the end products instead of the monohalogenated acids, as described.

It is thus seen that our process offers a commercially available method for producing a wide variety of valuable substituted organic acids, in exceptionally good yield and with minimum consumption of reagents.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. A process for producing a halogenated organic acid from a halogenated ketone which comprises oxidizing a substantial quantity of the halogenated ketone halogenated in an alkyl chain while rapidly dissipating the thermal energy created, at a rate at which undesired disruption of the ketone molecule is substantially avoided in the presence of an effective quantity of an acid-acting hydrolysis inhibitor.

2. A process for producing a halogenated organic acid in accordance with claim 1 in which the halogenated ketone halogenated in an alkyl chain is oxidized with nitric acid.

3. A process for producing a halogenated organic acid from a halogenated ketone which comprises oxidizing a halogenated ketone halogenated in an alkyl chain in the presence of water until a substantial portion of said ketone is oxidized while substantially suppressing halogen-hydrolysis reactions.

4. A process for producing a halogenated organic acid from a halogenated ketone which comprises oxidizing a halogenated ketone halogenated in an alkyl chain with nitric acid in the presence of water until a substantial portion of said ketone is oxidized while substantially suppressing halogen-hydrolysis reactions.

5. A process for producing a halogenated organic acid from a halogenated ketone which comprises reacting said halogenated ketone halogenated in an alkyl chain with an oxidizing agent, at least one of said reactants being in a highly disseminated form and rapidly dissipating any excess thermal energy at a rate at which undesired disruption of the ketone molecule is substantially avoided whereby substantial conversion of said ketone to said halogenated acid is effected.

6. A process for producing a halogenated organic acid from a halogenated ketone which comprises reacting said halogenated ketone halogenated in an alkyl chain with nitric acid, at least one of said reactants being in a highly disseminated form and rapidly dissipating any excess thermal energy at a rate at which undesired disruption of the ketone molecule is substantially avoided whereby substantial conversion of said ketone to said halogenated acid is effected.

7. A process for oxidizing a halogenated ketone halogenated in an alkyl chain which comprises oxidizing said ketone in the initial presence of a non-oxidizing acid acting compound.

8. A process for oxidizing a halogenated ketone halogenated in an alkyl chain which comprises oxidizing said ketone in the initial presence of a non-oxidizing acid.

9. A process for oxidizing a halogenated ketone halogenated in an alkyl chain which comprises oxidizing said ketone in the initial presence of a halogenated carboxylic acid.

10. A process for oxidizing a halogenated ketone halogenated in an alkyl chain which comprises building up an effective hydrolysis inhibiting non-oxidizing acid concentration in the reaction mixture by oxidation of said halogenated ketone and then maintaining said non-oxidizing acid concentration while oxidizing the halogenated ketone.

11. A process for oxidizing a halogenated ketone which comprises treating a halogenated ketone halogenated in an alkyl chain with an oxidizing acid in the presence of sufficient non-oxidizing acid to substantially suppress hydrolysis of said halogenated ketone under the reaction conditions.

12. A process for oxidizing a halogenated ketone which comprises treating a halogenated ketone halogenated in an alkyl chain with nitric acid in the presence of sufficient non-oxidizing acid to substantially suppress hydrolysis of said halogenated ketone under the reaction conditions.

13. A process for oxidizing a halogenated ketone which comprises oxidizing a chlorinated ketone chlorinated in an alkyl chain in the presence of sufficient non-oxidizing acid to substantially suppress hydrolysis of said halogenated ketone under the reaction conditions.

14. A process for oxidizing a halogenated ketone which comprises oxidizing a halogenated aliphatic ketone in the presence of sufficient non-oxidizing acid to substantially suppress hydrolysis of said halogenated ketone under the reaction conditions.

15. A process for oxidizing a halogenated ketone which comprises oxidizing a halogenated methyl ethyl ketone in the presence of sufficient non-oxidizing acid to substantially suppress hydrolysis of said halogenated ketone under the reaction conditions.

16. A process for producing an alpha halogenated propionic acid which comprises oxidizing an alpha halogenated methyl ethyl ketone in the presence of sufficient non-oxidizing acid to substantially suppress hydrolysis of said halogenated ketone under the reaction conditions.

17. A process for producing a halogenated acetic acid which comprises oxidizing a halogenated acetone in the presence of sufficient non-oxidizing acid to substantially suppress hydrolysis of said halogenated ketone under the reaction conditions.

18. A process for producing alpha chlor propionic acid which comprises oxidizing alpha-chlor-ethyl methyl ketone in the presence of sufficient non-oxidizing acid to substantially suppress hydrolysis of said halogenated ketone under the reaction conditions.

19. A process for producing a halogenated organic acid which comprises treating a halogenated ketone halogenated in an alkyl chain with a finely divided nitric acid solution in the presence of a non-oxidizing acid whereby substantial conversion of said ketone to said halogenated acid is effected.

20. A process for producing a halogenated organic acid which comprises reacting a halogenated ketone halogenated in an alkyl chain in an aqueous non-oxidizing acid medium with an oxidizing agent at a temperature at which substantial conversion of said ketone to said halogenated acid is effected.

21. A process for producing a halogenated organic acid which comprises oxidizing an alpha halogenated ketone halogenated in an alkyl chain in the initial presence of an acid oxidation product thereof.

22. A process for producing a halogenated organic acid which comprises reacting a halogenated ketone halogenated in an alkyl chain with an atomized aqueous nitric acid solution in the presence of an aqueous sulfuric acid solution.

23. A continuous process for producing a halogenated organic acid which comprises adding a halogenated ketone halogenated in an alkyl chain and an atomized aqueous nitric acid solution simultaneously to a reaction mixture comprising a halogenated organic acid and continuously withdrawing reaction products therefrom at such a rate that a substantially constant concentration of halogenated organic acid is maintained in the reaction mixture.

MARTIN DE SIMÓ.
CLYVE C. ALLEN.